(12) United States Patent
Baba et al.

(10) Patent No.: US 7,916,116 B2
(45) Date of Patent: Mar. 29, 2011

(54) LIQUID CRYSTAL DISPLAY

(75) Inventors: Masashi Baba, Chiba (JP); Yoshikazu Nakada, Mobara (JP)

(73) Assignees: Hitachi Displays, Ltd., Chiba (JP); Hitachi Display Devices, Ltd., Chiba (JP)

(*) Notice: Subject to any disclaimer, the term of this patent is extended or adjusted under 35 U.S.C. 154(b) by 885 days.

(21) Appl. No.: 11/025,941

(22) Filed: Jan. 3, 2005

(65) Prior Publication Data
US 2005/0146653 A1 Jul. 7, 2005

(30) Foreign Application Priority Data
Jan. 6, 2004 (JP) ................................. 2004-000987

(51) Int. Cl.
*G09G 3/36* (2006.01)
(52) U.S. Cl. ...................................... 345/102; 362/260
(58) Field of Classification Search .................... 362/29, 362/611, 260; 345/47, 102, 87
See application file for complete search history.

(56) References Cited

U.S. PATENT DOCUMENTS

| 5,975,722 | A | * | 11/1999 | Van Duijneveldt | 362/296 |
| 6,181,071 | B1 | * | 1/2001 | Yuuki et al. | 315/169.3 |
| 2002/0044437 | A1 | * | 4/2002 | Lee | 362/31 |
| 2002/0067332 | A1 | * | 6/2002 | Hirakata et al. | 345/102 |
| 2004/0042194 | A1 | * | 3/2004 | Hsieh | 362/31 |
| 2004/0257792 | A1 | * | 12/2004 | Yu et al. | 362/31 |

FOREIGN PATENT DOCUMENTS

| JP | 07234405 A * | 9/1995 | ................... 345/102 |
| JP | 10-162985 | 6/1998 | |
| JP | 2002-182182 | 6/2002 | |

* cited by examiner

Primary Examiner — Amr Awad
Assistant Examiner — Yong Sim
(74) Attorney, Agent, or Firm — Antonelli, Terry, Stout & Kraus, LLP.

(57) ABSTRACT

A liquid crystal display comprising the feature that a backlight comprises a cold cathode ray tube disposed on a surface facing a liquid crystal display panel and a chassis for supporting the cold cathode ray tube, and the cold cathode ray tube is set so that a distance from the chassis at an end to which a high voltage is applied becomes larger than a distance from the chassis at an end to which a low voltage is applied.

7 Claims, 5 Drawing Sheets

LIQUID CRYSTAL DISPLAY

BACKGROUND OF THE INVENTION

The present invention relates to a liquid crystal display, particularly to improvement of the backlight of the liquid crystal display.

In a liquid crystal display panel, transparent substrates serving as an envelope are oppositely disposed with a liquid crystal therebetween and a lot of pixels are formed in a spread direction of the liquid crystal and the aggregate of these pixels functions as a display portion.

The pixels are driven by independently changing light transmittances, and therefore, an external light source such as a backlight is normally needed. That is, an observer of a liquid crystal display recognizes the light from the backlight passing through the display portion of the liquid crystal display panel as an image.

The liquid crystal displays having the above-described structure have been invented in the liquid crystal display panel and the like in order to uniform the luminance of the display.

The luminance of the display of the liquid crystal display is inevitably influenced by the luminance of the backlight. Therefore, it is also an important consideration to uniform the luminance of the backlight.

The present invention is made in accordance with such circumstances and its object is to provide a liquid crystal display which uniforms the luminance of a backlight from the viewpoint of uniforming display luminance.

SUMMARY OF THE INVENTION

According to the invention, a liquid crystal display having at least one of the following features is provided.

(1) A backlight comprises a cold cathode ray tube disposed on a surface facing a liquid crystal display panel and a chassis for supporting the cold cathode ray tube, and the cold cathode ray tube is set so that a distance from the chassis at an end to which a high voltage is applied becomes larger than a distance from the chassis at an end to which a low voltage is applied.

(2) In a liquid crystal display used in a state stood from a horizontal plane, a backlight comprises a plurality of cold cathode ray tubes extending in parallel with the horizontal plane and vertically juxtaposed on a surface facing a liquid crystal display panel, and the cold cathode ray tubes are driven so that duty of a tube current waveform of a lower cold cathode ray tube becomes larger than that of a higher cold cathode ray tube.

(3) In a liquid crystal display used in a state stood from a horizontal plane, a backlight comprises a plurality of cold cathode ray tubes extending in parallel with the horizontal plane and vertically juxtaposed on a surface facing the liquid crystal display panel, and the cold cathode ray tubes are vertically divided into a plurality of groups, and the cold cathode ray tubes are driven so that duty of a tube current waveform of a lower group becomes larger than that of a higher group.

(4) In a liquid crystal display used in a state stood from a horizontal plane, a backlight comprises a plurality of cold cathode ray tubes extending in parallel with the horizontal plane and vertically juxtaposed on a surface facing a liquid crystal display panel, and the cold cathode ray tubes are driven so that a peak value of a tube current of a lower cold cathode ray tube becomes larger than that of a higher cold cathode ray tube.

(5) In a liquid crystal display used in a state stood from a horizontal plane, a backlight comprises a plurality of cold cathode ray tubes extending in parallel with the horizontal plane and vertically juxtaposed on a surface facing a liquid crystal display panel, and the cold cathode ray tubes are vertically divided into a plurality of groups, and the cold cathode ray tubes are driven so that a peak value of a tube current of a lower group becomes larger than that of a higher group.

(6) A backlight comprises a cold cathode ray tube set on a surface facing a liquid crystal display panel and a chassis for supporting the cold cathode ray tube, and the chassis has a projection having a ridge along a longitudinal direction of the cold cathode ray tube on a surface of the chassis immediately below the cold cathode ray tube.

(7) A backlight comprises a cold cathode ray tube set on a surface facing a liquid crystal display panel and a chassis for supporting the cold cathode ray tube, and the chassis has a groove along a longitudinal direction of the cold cathode ray tube on a surface of the chassis immediately below the cold cathode ray tube.

(8) In a liquid crystal display comprising a backlight having a cold cathode ray tube supported by a chassis through a support, the support supports the cold cathode ray tube so that a portion of the cold cathode ray tube at the liquid crystal panel side is exposed.

The present invention is not restricted to the above configurations. Various modifications of the present invention are allowed as long as the modifications are not deviated from the technical idea of the present invention.

Other objects, features and advantages of the invention will become apparent from the following description of the embodiments of the invention taken in conjunction with the accompanying drawings.

PREFERRED EMBODIMENTS OF THE INVENTION

An embodiment of a liquid crystal display of the present invention is described below by referring to the accompanying drawings.

Figure 1:
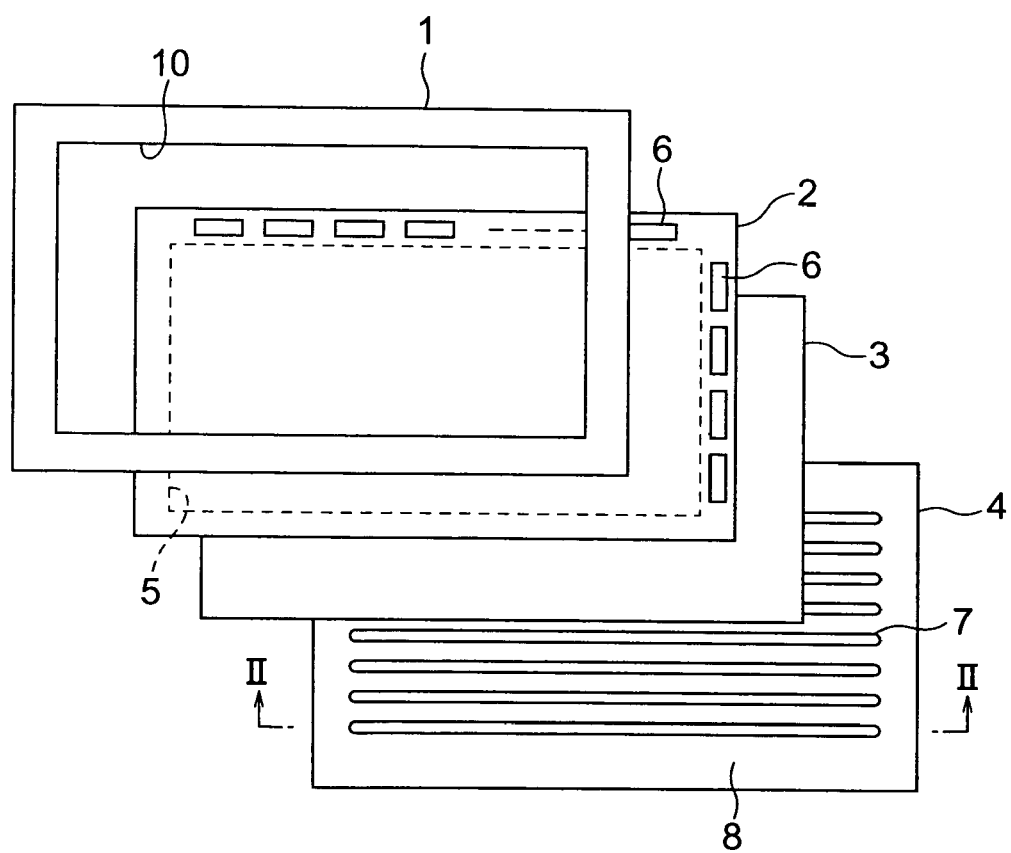
FIG. 1 is an exploded plan view of a liquid crystal display of the present invention.

FIG. 1 is an exploded view of a liquid crystal display formed into a module, in which a frame 1, a liquid crystal display panel 2, an optical sheet 3, and a backlight 4 are laminated successively from the front.

The liquid crystal display panel 2 is constituted so that transparent substrates constituting an envelope are oppositely disposed with liquid crystal therebetween and a lot of pixels are provided in a spread direction of the liquid crystal. The aggregate of the pixels constitutes a display portion 5 and the display portion 5 is located at a central portion of the liquid crystal display panel 2.

Each pixel is provided with a pair of electrodes on a surface of the transparent substrate facing the liquid crystal, electric field between these electrodes is controlled every pixel, and light modulation rate of the liquid crystal of the pixel concerned is controlled. A signal is supplied to the electrodes of each pixel by a driving circuit constituted by a plurality of semiconductor chips 6 mounted at a periphery of the liquid crystal display panel 2.

As described above, in the liquid crystal display panel 2, the liquid crystal of each pixel is optically modulated. Therefore, the panel 2 requires external light, and the backlight 4 is disposed at the back of the panel 2 relative to an observer. In FIG. 1, the optical sheet 3 is disposed between the liquid crystal display panel 2 and the backlight 4 to diffuse the light from the backlight 4 to the liquid crystal display panel 2.

The backlight 4 is referred to as the so-called just below type, which has a light source on a surface substantially in parallel with the liquid crystal display panel 2 and facing the display portion 5 of the liquid crystal display panel 2.

The light source comprises eight cold cathode ray tubes 7 which are juxtaposed at equal intervals.

The cold cathode ray tubes 7 are supported at their bottoms by a chassis 8 having a reflection function while slightly spaced apart from the chassis 8, and constitute the backlight 4 together with the chassis 8. The light from each cold cathode ray tube 7 includes the light reflected from the chassis 8 and going to the liquid crystal display panel 2 in addition to the light directly going to the liquid crystal display panel 2 and effective use of the light is intended.

A frame 1 having an opening (display window) 10 formed at a portion opposite to the display portion 5 of the liquid crystal display panel 2 is disposed on a surface of the liquid crystal display panel 2 at the observer side, and side surfaces of the frame 1 are fixed to the chassis 8 of the backlight 4 through caulking or the like.

Figure 2:
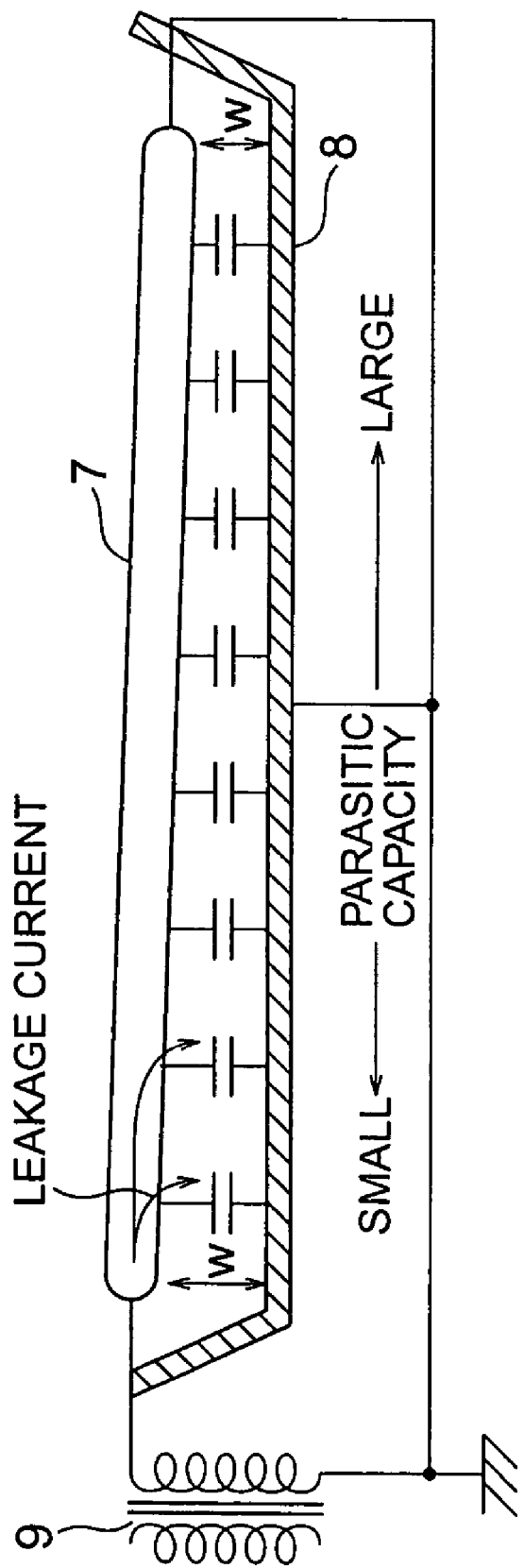
FIG. 2 is a sectional view taken along line II-II in FIG. 1 showing a chassis and a cold cathode ray tube supported by the chassis.

FIG. 2 shows a portion of the backlight 4 shown together with the chassis 8, which is a sectional view taken along the line II-II in FIG. 1.

The cold cathode ray tube 7 is driven so that a high voltage is applied from a power supply (inverter transformer) 9 at one end of the left side in FIG. 2 and a low voltage is applied at the other end.

The cold cathode ray tube 7 is set so that a distance W from the chassis 8 at the side to which the high voltage is applied is larger than that at the side to which the low voltage is applied.

Assuming that the length of the cold cathode ray tube 7 is 700 mm, for example, the distance from the chassis 8 is approximately 2 mm at the low voltage side, but it is approximately 3 to 4 mm at the high voltage side.

In this embodiment, a high voltage is applied from the power supply to seven remaining cold cathode ray tubes 7 in addition to the cold cathode ray tube 7 shown in FIG. 2 at one end of the left side in FIG. 2, and a low voltage is applied at the other end. Moreover, similarly to the case shown in FIG. 2, the distance from the chassis 8 is large, at the high voltage side and small at the low voltage side.

The reason of constituting the above structure is based on the fact that a current (leakage current) flows through a parasitic capacitance formed between the cold cathode ray tube 7 and the chassis 8, and the leakage current is larger at the high voltage side of the cold cathode ray tube 7 and smaller at the low voltage side. This becomes one factor in which light intensity is changed along the longitudinal direction of the cold cathode ray tube 7 and luminance irregularity occurs on an image of the liquid crystal display panel 2.

Therefore, as described above, by increasing the distance W to the chassis 8 at the high voltage side of the cold cathode ray tube 7, the parasitic capacitance between the cold cathode ray tube 7 and the chassis 8 is decreased and the leakage current is decreased.

Thereby, the leakage current of the cold cathode ray tube 7 becomes uniform along the longitudinal direction of the tube 7, and the intensity of the light emitted from the tube 7 is uniformed.

The cold cathode ray tube 7 is supported by the chassis 8 through a rubber grommet at each end. Therefore, by changing heights of the rubber grommets, it is possible to increase the distance from the chassis 8 at the high voltage side and decrease it at the low voltage side.

Figure 3:
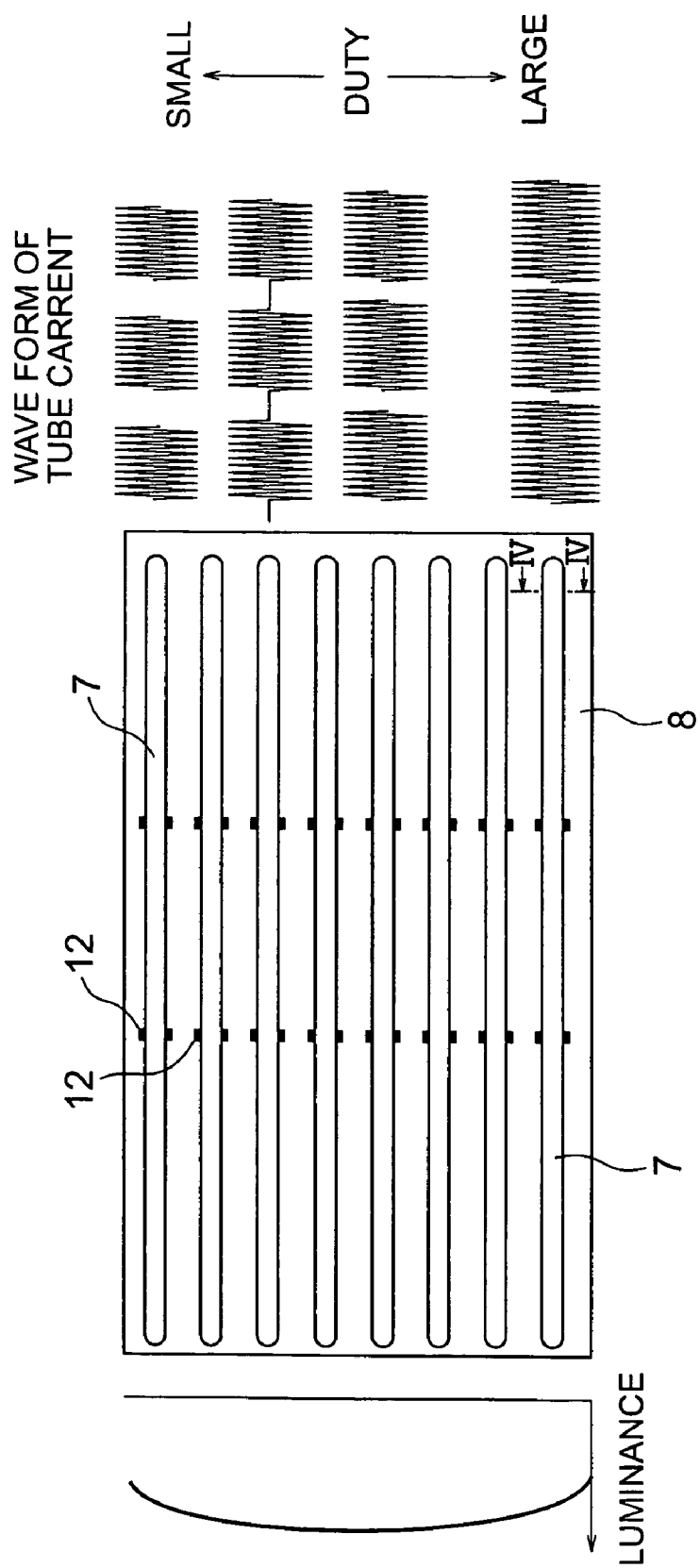
FIG. 3 is a structural view of an embodiment of a liquid crystal display of the present invention in which a driving current waveform to be supplied to each cold cathode ray tube is shown.

FIG. 3 is a plan view showing the backlight 4 comprising the chassis 8 and the cold cathode ray tubes 7 supported by the chassis 8.

In a practical use of the liquid crystal display, an upper end of the backlight 4 in FIG. 3 is located above and a lower end of the backlight 4 is located below. This is because a liquid crystal display is used by slightly tilting it from the vertical plane with respect to an observer and it is normal to use the liquid crystal display in a stood state.

In this case, duty of a tube current waveform to be supplied to a lower cold cathode ray tube 7 becomes larger than the duty of a tube current waveform to be supplied to a higher cold cathode ray tube. In other words, the duty of a tube current waveform of the highest cold cathode ray tube is the smallest and the duty gradually increases as a cold cathode ray tube is located at a lower position and the duty of a cathode ray tube located at the lowest position is the largest.

The reason why the above-described structure is employed is as follows. When a liquid crystal display is used in a stood state, the heat generated from the cold cathode ray tubes 7 results convection and it is liable that the temperature rises at the upper end and lowers at the lower end. In this case, it is confirmed that an ambient temperature of the upper-end cold cathode ray tube 7 becomes approximately 80° C. due to convection. In this case, a phenomenon occurs that the luminance of each cathode ray tube 7 rises when the ambient temperature is high and lowers when the ambient temperature is low, and luminance irregularity occurs over the vertical direction of the display portion 5 of the liquid crystal display panel 2. Therefore, as described above, by decreasing the duty of a tube current waveform thereby lowering luminance at a higher cold cathode ray tube 7, and by increasing the duty of a tube current waveform thereby raising luminance at a lower cold cathode ray tube 7, the whole luminance distribution is uniformed.

The same advantage is obtained by changing peak values of a tube current in driving each cathode ray tube 7. That is, it is also allowed to drive each cathode ray tube 7 so that the peak value of the tube current of a lower cold cathode ray tube 7 becomes larger than that of a higher cold cathode ray tube 7.

Moreover, it is not always necessary to change duties or peak values of a tube current for every cathode ray tube 7. It is needless to say that it is allowed to change duties or peak values for every plurality of cathode ray tubes. That is, it is a matter of course that it is allowed to group cold cathode ray tubes 7 adjacent to each other so that the duty or peak value of a tube current of a lower group becomes larger than the duty or peak value of a tube current of a higher group.

Figure 4:
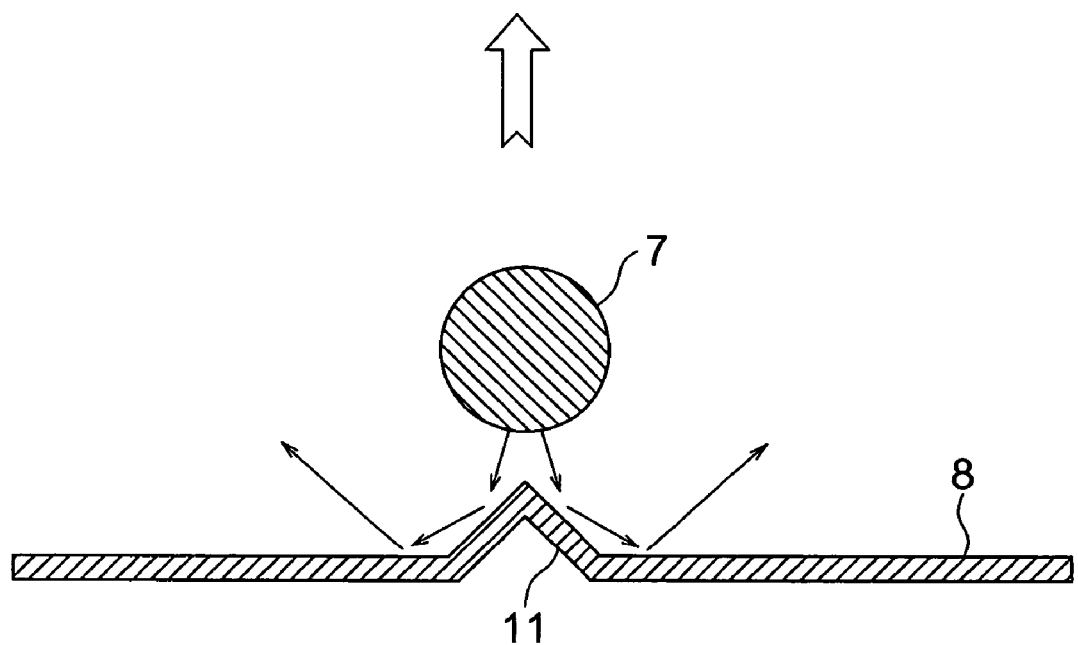
FIG. 4 is a sectional view taken along line IV-IV in FIG. 3.

FIG. 4 is a sectional view taken along the line IV-IV in FIG. 3, which shows a cross section of the cold cathode ray tube 7 at a plane orthogonal to the longitudinal direction of the cold cathode ray tube 7.

A mountain shaped projection 11 is formed on the chassis 8 immediately below the cold cathode ray tube 7 and the ridge line of the projection 11 is formed along the longitudinal direction of the cold cathode ray tube 7.

The reason why the above-described structure is employed is that the light emitted from the cold cathode ray tube 7 to the chassis 8 immediately below the cold cathode ray tube 7 is reflected from slopes of the projection 11, as shown by arrows in FIG. 4, thereby preventing the light reflected by the chassis 8 from going to the cold cathode ray tube 7.

When the projection 11 is not formed, the reflected light of the light emitted from the cold cathode ray tube 7 to the chassis 8 immediately below the cold cathode ray tube passes through almost the same route as that of incident light and is oriented to the cold cathode ray tube 7. Therefore, the reflected light is shielded and absorbed by the cold cathode ray tube 7 and it does not reach the liquid crystal display panel 2 and the brightness is inevitably decreased by the value equivalent to the shielded and absorbed light quantity. Therefore, by using the configuration shown in FIG. 4, the optical path of the light emitted to the chassis 8 immediately below the cold cathode ray tube 7 among the light emitted from the cold cathode ray tube 7 is changed by the projection 11 and led to the liquid crystal display panel 2.

The shape of the cross section of the projection 11 is not always restricted to a chevron. Even a semi-circle shape provides the same advantage. Moreover, by forming a V-shaped or semi-circle-shaped groove portion without being restricted to a projection, the same advantage can be obtained. In short, the same advantage can be obtained when a shape having a top or bottom along the longitudinal direction of the cold cathode ray tube 7 on the surface of the chassis 8 immediately below the cold cathode ray tube 7 and having slopes at the both sides of the top or bottom.

FIG. 4 shows the chassis 8 having a function of reflection of light. However, when the chassis 8 does not have a reflection function but a surface of the chassis 8 is covered with a sheet-having a reflection function, it is needless to say that it is allowed to provide the above-described configuration for the sheet.

Figure 5:
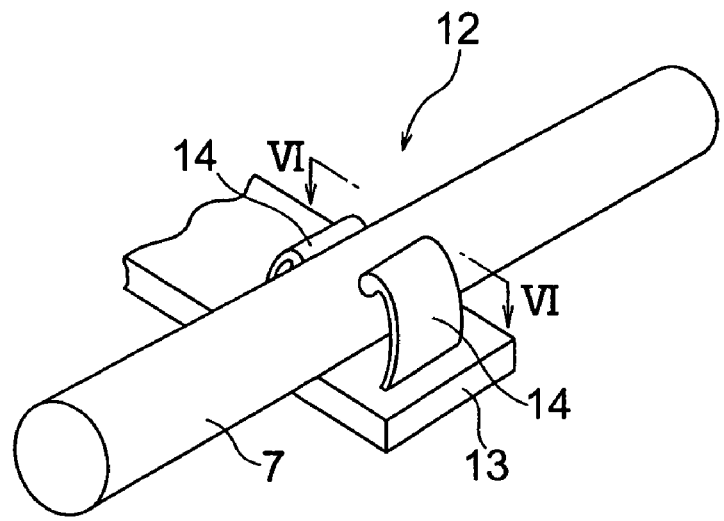
FIG. 5 is a perspective view of a support used for an embodiment of a liquid crystal display of the present invention.

FIG. 5 is a view showing a configuration of a support 12 to fix the cold cathode ray tube 7 on the chassis 8. The length of the cold cathode ray tube 7 increases correspondingly to increase of a recent liquid crystal display in size, and it is inevitable to support not only the both ends of the cold cathode ray tube but also the middle portion thereof. For example, in FIG. 3, it is necessary to dispose the supports 12 in an area facing the display portion 5 of the liquid crystal display panel 2. Thus, a problem occurs that the light from the cold cathode ray tube 7 is shielded at portions to which the supports 12 are disposed.

Figure 6:
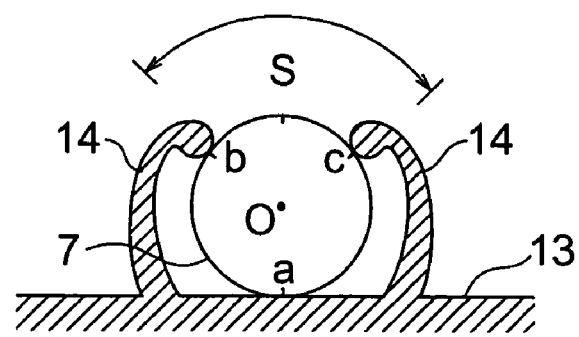
FIG. 6 is a sectional view taken along line VI-VI in FIG. 5.

FIG. 5 is a perspective view showing a state in which the support 12 supports the cold cathode ray tube 7, and FIG. 6 is a sectional view taken along the line VI-VI in FIG. 5.

A pair of finger portions 14 is formed on a base 13 of the support 12 so as to press sides of the cold cathode ray tube 7 by forward ends thereof.

More specifically, the cold cathode ray tube 7 is supported by three points such as a contact point a with the base 13, and contact points b and c with the finger portions 14, and supported so that a portion S between the finger portions 14 and facing a liquid crystal panel is exposed. It is a matter of course that it is allowed to bring the contact of the forward end of each finger portion 14 with the cold cathode ray tube 7 into a point contact by forming a hemispherical projection on the contact portion with the cold cathode ray tube 7. It is also allowed to form a projection at the base 13.

Each finger portion 14 has slight elasticity and applies a force for pressing the cold cathode ray tube 7 against the bed plate 13, so that the cold cathode ray tube 7 cannot be easily removed from the support 12. However, when setting the cold cathode ray tube 7 to the support 12, it is possible to easily set the cold cathode ray tube 7 by pressing the cold cathode ray tube 7 from the above.

The support 12 thus constituted can achieve sufficient light emission at the side S (between finger portions 14: range between arrows in FIG. 6) of the cold cathode ray tube 7. In other words, because the finger portions 14 do not work as an obstacle for light emission, it is possible to extremely decrease adverse effect of the support 12 even if the support 12 is set in the region of the display portion 5. Therefore, it is possible to uniform the emission of the light from each cold cathode ray tube 7 in the region of the display portion 5.

FIG. 5 shows the support 12 for supporting one cold cathode ray tube 7. However, it is needless to say that it is allowed to use a configuration for supporting two or more cold cathode ray tubes 7. That is, it is a matter of course that it is allowed to use a configuration in which the base 13 of the support 12 is extended in a direction perpendicular to the longitudinal direction of the cold cathode ray tube 7 and finger portions 14 for supporting two or more cold cathode ray tubes 7 perpendicular to the base 13 are formed.

It is allowed that the above-described embodiments are independently used or used by combining them. This is because it is possible to exhibit the advantage of each embodiment independently or in combination.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A liquid crystal display comprising:
a liquid crystal display panel, and
a backlight disposed behind the liquid crystal display panel,
wherein the backlight comprises at least one cold cathode ray tube having a first end and a second end, the at least one cold cathode ray tube being disposed so as to face a rear surface of the liquid crystal display panel, and a chassis having at least one support for supporting the at least one cold cathode ray tube, and the at least one cold cathode ray tube is set so that a distance from a bottom of the chassis to the first end of the at least one cold cathode ray tube to which a high voltage is applied is larger than a distance from the bottom of the chassis to the second end of the at least one cold cathode ray tube to which a low voltage is applied,
wherein the bottom of the chassis extends in a plane substantially parallel to a plane of the liquid crystal display panel, and the at least one cold cathode ray tube extends in a plane which is not parallel to the plane of the bottom of the chassis, and
wherein the at least one support includes a base to be attached on the chassis and extending in a direction perpendicular to a longitudinal direction of the at least one cold cathode ray tube, and at least one pair of finger portions having elasticity and extending substantially perpendicularly from the base, free ends of the pair of finger portions being disposed so as to elastically press the at least one cold cathode ray tube which is fitted between the finger portions in a direction toward the base.

2. The liquid crystal display according to claim 1, wherein the liquid crystal display panel has an upper side and a lower side and is arranged in a plane different from a horizontal plane, and the backlight comprises a plurality of cold cathode ray tubes extending in parallel and juxtaposed on a surface facing the liquid crystal display panel so as to extend from an upper side to a lower side, the plurality of cold cathode ray tubes each having the first end and the second end, and the cold cathode ray tubes are driven so that a duty cycle of a tube current waveform of cold cathode ray tube at the lower side at least equals a duty cycle of a tube current waveform of a cold cathode ray tube at the upper side.

3. The liquid crystal display according to claim 1, wherein the liquid crystal display panel has an upper side and a lower side and is arranged in a plane different from a horizontal plane, and the backlight comprises a plurality of cold cathode ray tubes extending in parallel plane and juxtaposed on a surface facing the liquid crystal display panel so as to extend from an upper side to a lower side, the plurality of cold cathode ray tubes each having the first end and the second end, and the cold cathode ray tubes are driven so that a peak value of a tube current of a cold cathode ray tube at the lower side at least equals a peak value of a tube current of a cold cathode ray tube at the upper side.

4. The liquid crystal display according to claim 1, wherein the chassis supports the cold cathode ray tube, and the chassis has a projection having a ridge along a longitudinal direction of the cold cathode ray tube on a surface of the bottom of the chassis immediately below the cold cathode ray tube so that a distance from the ridge to the first high voltage end of the cold cathode ray tube is larger than a distance from the ridge to the second low voltage end of the cold cathode ray tube.

5. The liquid crystal display according to claim 1, wherein the chassis has a groove along a longitudinal direction of the cold cathode ray tube on a surface of the bottom of the chassis immediately below the cold cathode ray tube so that a distance from the groove to the first high voltage end of the cold cathode ray tube is larger than a distance from the groove to the second low voltage end of the cold cathode ray tube.

6. The liquid crystal display according to claim 2, wherein the cold cathode ray tubes are grouped into a plurality of groups, and the cold cathode ray tubes are driven so that the duty cycle of the tube current waveform of a group at the lower side exceeds the duty cycle of the tube current waveform of a group at the upper side.

7. The liquid crystal display according to claim 3, wherein the cold cathode ray tubes are grouped into a plurality of groups and are driven so that a peak value of a tube current of a group at a lower side exceeds a peak value of a tube current of a group at the upper side.

* * * * *